No. 818,899. PATENTED APR. 24, 1906.
W. E. MARTIN.
SIDE DELIVERY RAKE.
APPLICATION FILED OCT. 14, 1905.
2 SHEETS—SHEET 1.
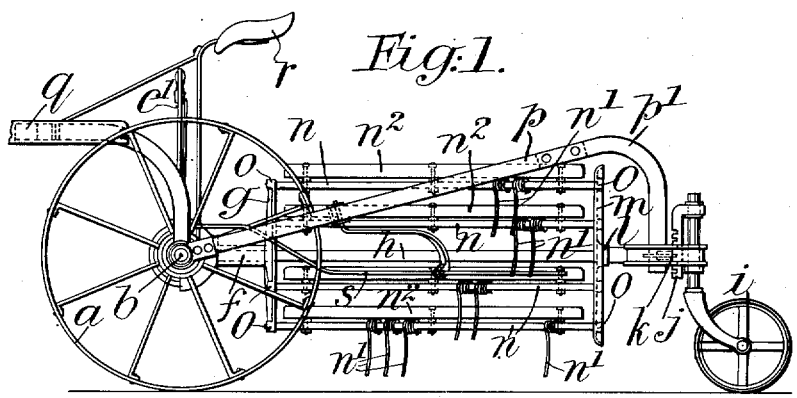
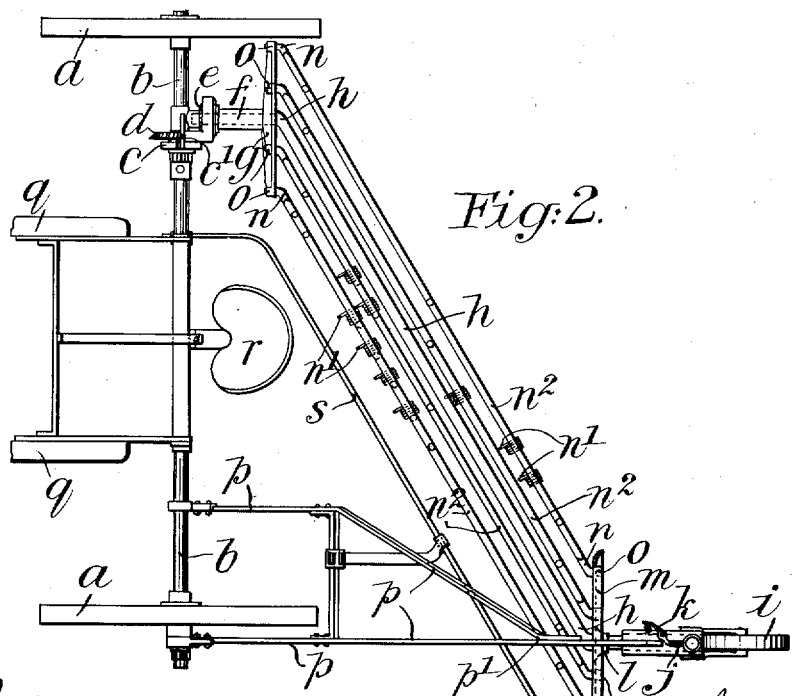

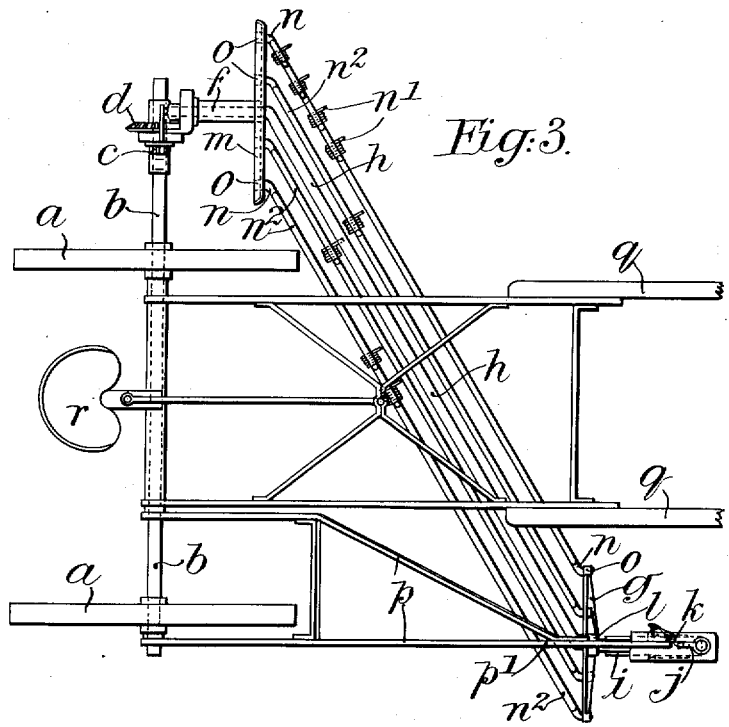

UNITED STATES PATENT OFFICE.

WILLIAM EDWARD MARTIN, OF STAMFORD, ENGLAND.

SIDE-DELIVERY RAKE.

No. 818,899.　　Specification of Letters Patent.　　Patented April 24, 1906.

Application filed October 14, 1905. Serial No. 282,789.

*To all whom it may concern:*

Be it known that I, WILLIAM EDWARD MARTIN, a subject of the King of Great Britain, residing at Stamford, in the county of Lincoln, England, have invented new and useful Improved Side-Delivery Rakes, of which the following is a specification.

The invention relates to that type of side-delivery rakes for hay and other produce having a number of rakes the teeth of which are always in a hanging vertical position, said rakes being arranged obliquely to the line of travel of the machine.

The object of the present invention is to construct a more simple and efficient side-delivery rake of this type. Hitherto such side-delivery rakes have been rotated or moved at right angles to the oblique position of the rakes, and, owing to the forward motion of the machine, the rakes did not deliver the crop rapidly to the side, but had a tendency to rake it forward, thus doing unnecessary work. In side-delivery rakes constructed according to my invention the rakes are caused to move in a circular path at right angles to the line of travel of the machine.

The invention is illustrated in the accompanying drawings, in which—

Figure 1 is a side elevation, and Fig. 2 a plan, of a side-delivery rake, in which the raking mechanism is carried behind the main axle and driving-wheels. Fig. 3 is a plan of a side-delivery rake with the raking mechanism arranged in front of the main axle and driving-wheels. Fig. 4 is a front view, and Fig. 5 is a section showing the method of fixing the tines or rake-teeth to their head.

In carrying the invention into effect, as shown at Figs. 1, 2, 4, and 5, I employ two carrying and driving wheels $a$, giving motion to an axle $b$, which by means of a suitable form of clutch $c$ gives motion to the bevel-wheel $d$, mounted loosely on the axle $b$. The bevel-wheel $d$ gears with the bevel-wheel $e$, fixed on one end of a sleeve $f$, on the other end of which is fixed a number of radial arms $g$. The sleeve $f$ is mounted on the forward end of a bent rod $h$, the front and rear portions of which are parallel to each other and at right angles to the main axle $b$, the intermediate part of such rod $h$ being arranged obliquely to the line of travel of the machine. This bent rod $h$ is hung at its front end on the main axle $b$ of the machine and is supported at its rear end by a swiveling carrying-wheel $i$, provided with means, such as the rack $j$ and catch $k$, whereby the rear end of the rod $h$ may be adjusted vertically.

On the rear portion of the bent rod $h$ is mounted a hub $l$, carrying a disk $m$. The rake-heads $n$ conform in shape to the bent rod $h$, the front and rear parallel portions being carried in bearings $o$ in said radial arms $g$ and disk $m$. The radial arms $g$, the rakes $n$, and disk $m$ are caused to rotate at right angles to the line of travel of the machine.

The rear end of the bent rod $h$ is steadied with relation to the main axle $b$ by means of the double stay $p$, hung on said axle $b$ at its front end. This double stay is inclined upward and so bent at its rear end $p'$ as to pass over or clear the rotating rakes $n$ $n'$ $n^2$ and terminates with a vertical portion. The outer member of the double stay $p$ is straight. The other member is parallel to the straight one for a certain distance and is then bent sidewise into contact with the straight one and is fixed to it. A cross-piece connects the two parallel portions of the double stay $p$ and strengthens the same. The machine is provided with a pair of shafts $q$, hung on the main axle $b$, for a horse or other animal, with a seat $r$ for the driver with the usual clutch-lever $c'$ and with a stripping-rod S. The rake-teeth $n'$ are preferably fixed to the rake-heads $n$ by means of the bolts $t$ passing through the rake-heads $n$ and having nuts $u$ on each side thereof. These bolts $t$ also act to fix the bars $n^2$ to the rake-heads $n$, and thus enable deeper rakes to be obtained without increasing the size of the radial arms $g$ and disk $m$. The bars $n^2$ at the same time strengthen the rake-heads $n$. In lieu of employing a live axle, as here shown, I may employ a fixed axle and mount one or both the carrying and driving wheels $a$, clutch $c$, and bevel-wheel $d$ on sleeves. I may also employ radial arms, such as $g$, instead of the disk $m$ or two disks $m$. The stay $p$ may be bent to pass around the end of the rake instead of over it.

The machine shown at Fig. 3 is very similar to that shown in Figs. 1 and 2, except that one of the carrying-wheels $a$ is arranged nearer to the seat $r$, and the axle $b$, carrying the end of the bent rod $h$, projects beyond such wheel $a$. It will also be noticed that a disk $m$ is shown attached to the sleeve $f$ and radial arms are fixed to the hub $l$.

Having now particularly described and ascertained the nature of my said invention and in what manner the same is to be performed, I declare that what I claim is—

1. In a side-delivery rake the combination of a number of rakes of length to extend completely across the machine, set obliquely to the line of travel, and means for holding the teeth always in a hanging vertical position and giving to such teeth a rotary motion at right angles to the line of travel of the machine that is to say parallel to the main axle substantially as herein set forth.

2. In a side-delivery rake the combination of a number of rakes of length to extend completely across the machine, set obliquely to the line of travel, means for holding the teeth always in a hanging vertical position and giving to such teeth a rotary motion at right angles to the line of travel of the machine that is to say parallel to the main axle, a bent rod, the front and rear portions of which are parallel to each other and at right angles to the main axle, a sleeve mounted on one of the parallel portions of the rod, means for communicating motion to said sleeve from the main axle of the machine, a hub mounted on the other parallel portion of said rod, rake-heads of like shape to that of the bent rod and means carried by said sleeve and hub having bearings to receive the parallel ends of the rake-heads substantially as herein set forth.

3. In a side-delivery rake the combination of a number of rakes of length to extend completely across the machine, set obliquely to the line of travel, means for holding the teeth always in a hanging vertical position and giving to such teeth a rotary motion at right angles to the line of travel of the machine that is to say parallel to the main axle, a bent rod, the front and rear portions of which are parallel to each other and at right angles to the main axle, a sleeve mounted on one of the parallel portions of the rod and hung on the main axle, means for communicating motion to said sleeve from the main axle of the machine, a hub mounted on the other parallel portion of said rod, rake-heads of like shape to that of the bent rod, means carried by said sleeve and hub having bearings to receive the parallel ends of the rake-heads, a swiveling wheel to support the other parallel portion of the bent rod, means for adjustment in height of that end of the bent rod and a steadying-stay hung on the main axle and bent to clear the rakes, substantially as herein set forth.

4. In a side-delivery rake, the combination of a number of rakes of length to extend completely across the machine set obliquely to the line of travel, means for holding the teeth always in a hanging vertical position and giving to such teeth a rotary motion at right angles to the line of travel of the machine, a bent rod hung at its forward end on the main axle of the machine and supported at its rear end by a swiveling wheel, and a double steadying-stay hung on said main axle having an upwardly and rearwardly inclined straight portion, a bent portion to clear the rotating rakes, and a vertical portion connected at its lower end to the said bent rod, substantially as set forth.

5. In a side-delivery rake, the combination of a number of rakes of length to extend completely across the machine set obliquely to the line of travel, means for holding the teeth always in a hanging vertical position and giving to such teeth a rotary motion at right angles to the line of travel of the machine, a bent rod hung at its forward end on the main axle of the machine and supported at its rear end by a swiveling wheel, of a steadying-stay having two members hung at one end on the main axle such members being arranged at a certain distance apart on the axle, parts of said members being parallel to each other and connected by a cross-piece, and one of said members being bent sidewise into contact with the other member to which it is fixed, such members forming a straight upwardly and rearwardly inclined stay, a bent portion of one of the members passing over the rotating rakes, and a vertical portion connected at its lower end to the said bent rod, substantially as set forth.

6. In a side-delivery rake, the combination of a number of rakes extending completely across the machine in an oblique direction the heads of such rakes having their ends parallel to the line of travel of the machine, means for holding the teeth of such rakes always in a hanging vertical position and for giving to such teeth a rotating motion at right angles to the line of travel of the machine, bolts passing vertically through the rake-heads and securing the teeth by nuts on each side thereof, and bars fixed to the upper sides of the oblique portions of the rake-heads by said bolts, substantially as set forth.

In witness whereof I have hereunto set my hand in presence of two witnesses.

WILLIAM EDWARD MARTIN.

Witnesses:
B. J. B. MILLS,
WM. GIRLING.